(12) United States Patent
Weiss et al.

(10) Patent No.: US 6,793,278 B2
(45) Date of Patent: Sep. 21, 2004

(54) DRAFT DEFLECTOR FOR AN OPENING OF A MOTOR VEHICLE ROOF

(75) Inventors: Edgar Weiss, Alzenau (DE); Bardo Imgram, Seligenstadt (DE)

(73) Assignee: ArvinMeritor GmbH, Dietzenbach (DE)

( * ) Notice: Subject to any disclaimer, the term of this patent is extended or adjusted under 35 U.S.C. 154(b) by 18 days.

(21) Appl. No.: 10/366,624

(22) Filed: Feb. 13, 2003

(65) Prior Publication Data

US 2003/0168891 A1 Sep. 11, 2003

(30) Foreign Application Priority Data

Feb. 13, 2002 (DE) .......................................... 102 06 091

(51) Int. Cl.[7] .................................................. B60J 7/22
(52) U.S. Cl. ...................................................... 296/217
(58) Field of Search ........................................... 296/217

(56) References Cited

U.S. PATENT DOCUMENTS

| | | | | |
|---|---|---|---|---|
| 3,711,150 A | * | 1/1973 | Perks | 296/217 |
| 3,984,143 A | * | 10/1976 | Vermeulen | 296/217 |
| 4,630,859 A | * | 12/1986 | Bienert et al. | 296/217 |
| 5,609,388 A | * | 3/1997 | Hattass et al. | 296/217 |
| 5,660,429 A | * | 8/1997 | Wienchol | 296/217 |
| 6,523,889 B2 | * | 2/2003 | Birndorfer et al. | 296/217 |

FOREIGN PATENT DOCUMENTS

| | | | |
|---|---|---|---|
| DE | 36 43 738 C1 | 3/1988 | |
| DE | 3722361 | * 1/1989 | |
| DE | 3446916 C2 | 12/1990 | |
| DE | 39 06 685 C2 | 5/1991 | |
| DE | 43 23 694 C1 | 8/1994 | |
| DE | 44 17 049 C1 | 6/1995 | |
| DE | 44 46 016 C1 | 1/1996 | |
| DE | 44 44 630 C1 | 2/1996 | |
| DE | 198 53 358 A1 | 5/2000 | |
| DE | 199 58 748 A1 | 6/2001 | |
| NL | 7510515 | * 3/1977 | 296/217 |

OTHER PUBLICATIONS

European Search Report mailed May 22, 2003.

* cited by examiner

*Primary Examiner*—Dennis H. Pedder
(74) *Attorney, Agent, or Firm*—Carlson, Gaskey & Olds

(57) ABSTRACT

A draft deflector for a sliding or sliding-lifting vehicle roof structure such as a sunroof includes a base body, which guarantees dimensional stability and strength, and flexible plastics elements secured to the base body. The flexible elements reduce vibration, wind noise or both. In some examples, the flexible elements are injection molded onto the base body at all locations which are relevant in terms of noise generation.

16 Claims, 4 Drawing Sheets

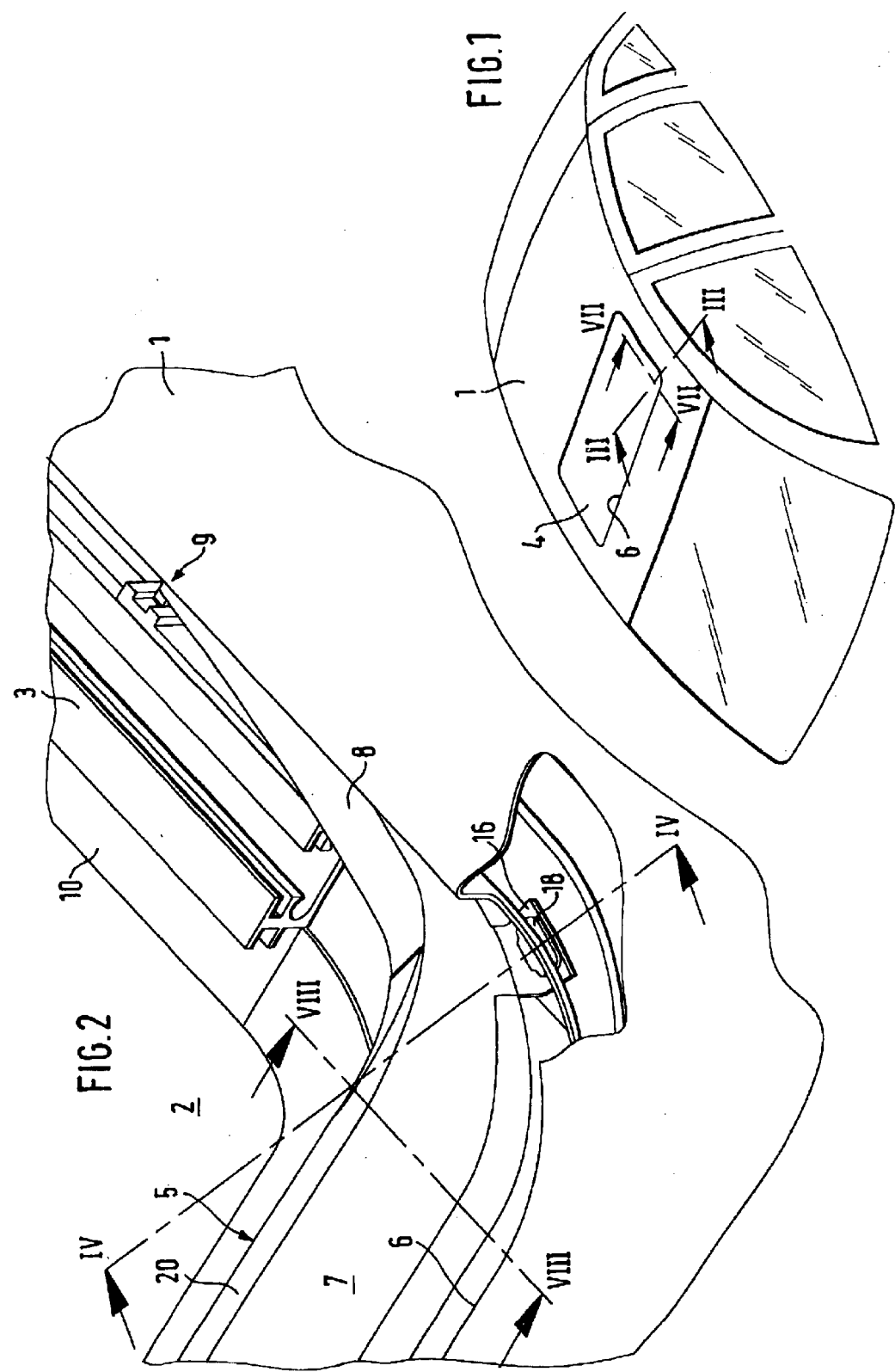

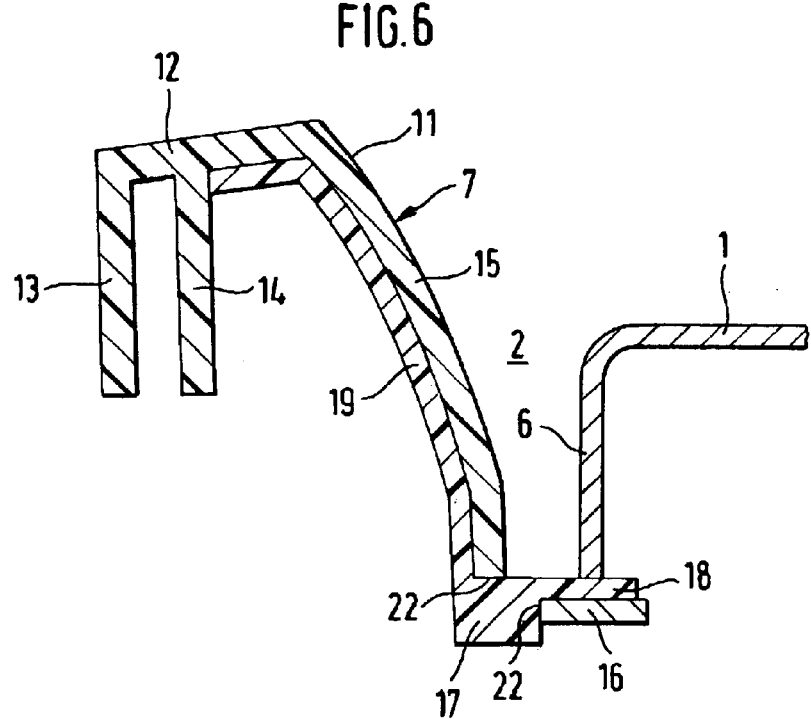
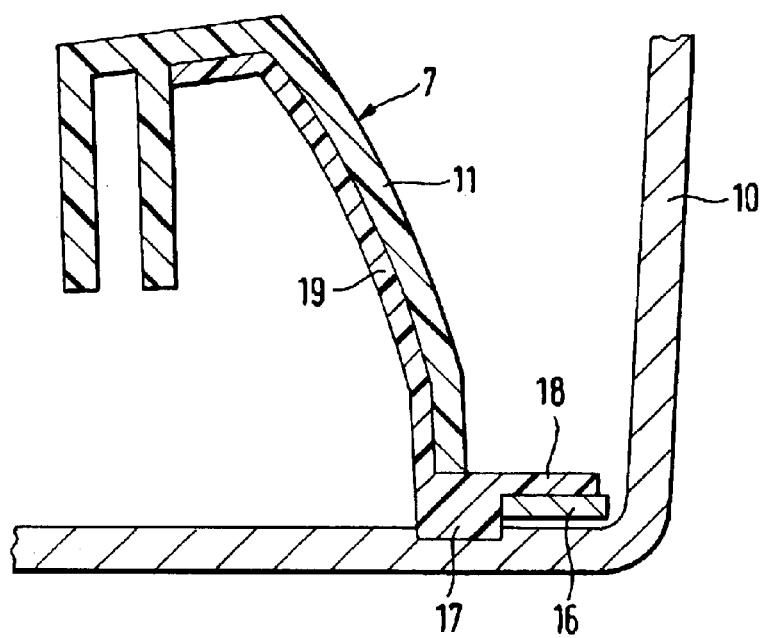

DRAFT DEFLECTOR FOR AN OPENING OF A MOTOR VEHICLE ROOF

CROSS REFERENCE TO RELATED APPLICATIONS

This application claims priority to German Application No. 102 06 091.6 filed Feb. 13, 2002.

1. Field of the Invention

The invention generally relates to a draft deflector for an opening in a roof of a motor vehicle. More particularly, this invention relates to a draft deflector comprised of a plurality of parts, which consist of different materials.

2. Description of the Related Art

Conventional sunroofs or moonroofs sometimes include draft deflectors that swing upwards out of a rest position into an operating position responsive to a spring force acting on them when the roof cover is opened. The function of draft deflectors is to reduce the wind noises occurring during travel with the roof cover entirely or partly open. The deflectors return to the rest position against the spring force when the cover is closed.

The wind force acting on the extended draft deflector during vehicle travel causes the deflector to vibrate. These vibrations may lead to disturbing draft deflector movements and, as a result, unwanted rattling noises if the swinging draft deflector strikes against fixed roof structure components. Rough driving conditions may also cause the draft deflector to vibrate in its rest position and strike against adjacent components with a rattling effect.

One draft deflector is shown in the German document DE 198 26 434 C1. The arrangement in that document provides a vibration-proof state of the draft deflector for the extended, operating position. A spring force and a toggle arrangement, which underpins the roof opening in a conventional manner and also supports the draft deflector by extension arms attached to the latter at the sides, reduce vibrations. A significant drawback, however is that the toggle arrangement is expensive and entails increased assembly expenses.

An example, known draft deflector is shown in DE 44 46 016 C1. That deflector is formed as a general-purpose base section comprising, for example, a light metal extruded section having a locating channel in which a rubber or plastics sealing section, which represents the rear region of the draft deflector body, is inserted. The sealing section is selected according to individual requirements to secure the most favorable shape from a group of differently shaped sealing sections. No measures are provided in the case of this known draft deflector to prevent unwanted rattling noises or vibrations in the operating position and the rest position.

There is a need for an improved draft deflector that reduces rattling and vibration. This invention provides a draft deflector that reduces noise-generating influences while avoiding the drawbacks of the prior art.

SUMMARY OF THE INVENTION

In general terms, this invention is a draft deflector for use with an opening in a vehicle roof. The inventive deflector has a deflector body comprising a dimensionally stable plastics base body and a flexible component secured to at least a portion of the base body. In one example, the flexible component is injection molded onto the base body to obtain a positive or adhesive bond. The inventive arrangement opens up the advantageous possibility of providing the flexible component at all locations of the base body where noise-reducing measures are recognized to be advantageous or expedient.

The flexible component in one example effectively attenuates impact and rattling noises when the deflector is in a rest position. In this example, portions of the flexible component protrude downwards at least partly beyond the base body. Such flexible component portions contact the front part of the roof frame from above when the deflector is in the rest position.

In another example, the wind noises arising due to turbulence during travel when the draft deflector is extended are attenuated by a flexible plastics element that preferably extends continuously over the length of the base body. The flexible element is injection molded onto the face which forms the top face of the base body in the operating position. In one example, the flexible element has a structured surface to influence the flow of air, across the deflector.

In another example, flexible plastics elements are injection molded onto the base body and protrude beyond the front edge of the base body. This example prevents the draft deflector from striking against the front wall of the front part of the roof frame with a rattling effect when the deflector is in the rest position.

One example embodiment has the forward protruding flexible plastics element formed essentially as a hollow section which extends continuously over the length of the base body and which closes the gap between the base body and the front edge of the roof opening in the extended operating position. This gap between the base body and the front edge of the roof opening (i.e., the bevel of the roof panel) is structurally inevitable, because on the one hand the draft deflector should not strike against the front edge of the roof opening and the front part of the roof frame when executing its swinging movements, and on the other hand manufacturing tolerances are to be compensated by the gap. When the draft deflector is in the operating position, the gap which is found in many known draft deflectors allows air to flow downwards through the gap and under the draft deflector during vehicle travel, which may entail substantial wind noises and play a part in making the draft deflector vibrate. Closing the gap when the draft deflector is in the operating position with elastic adaptation or deformation of the hollow section remedies such situations.

Flexible plastics elements in one example are injection molded onto the stops which limit the swing-out travel of the draft deflector. These flexible plastics elements, which effectively attenuate impact noises, may preferably be integrally injection molded with flexible plastics elements protruding downwards beyond the base body so that the stops mark both limit positions of the draft deflector to achieve low impact noise levels.

The base body in some examples preferably comprises a thermoplastic material reinforced with glass or carbon fibres and therefore has the required strength and dimensional stability. In another example, the base body is a cut-to-length extruded aluminium section.

BRIEF DESCRIPTION OF THE DRAWINGS

Further details of the invention are illustrated in detail with reference to the preferred embodiments which are represented in the drawings, in which:

FIG. 1 is a perspective view of a vehicle roof having a sliding roof with the cover closed.

FIG. 2 is a broken-away perspective view onto the left-hand corner, in the front in the direction of travel, of the vehicle roof according to FIG. 1 with the cover (not shown) open and a draft deflector extended into its operating position.

FIG. 5 shows a broken-away section similar to FIG. 3 with a draft deflector according to another embodiment.

FIG. 6 shows a broken-away section similar to FIG. 4 with the embodiment of FIG. 5.

DETAILED DESCRIPTION OF THE PREFERRED EMBODIMENT

Figure 4:
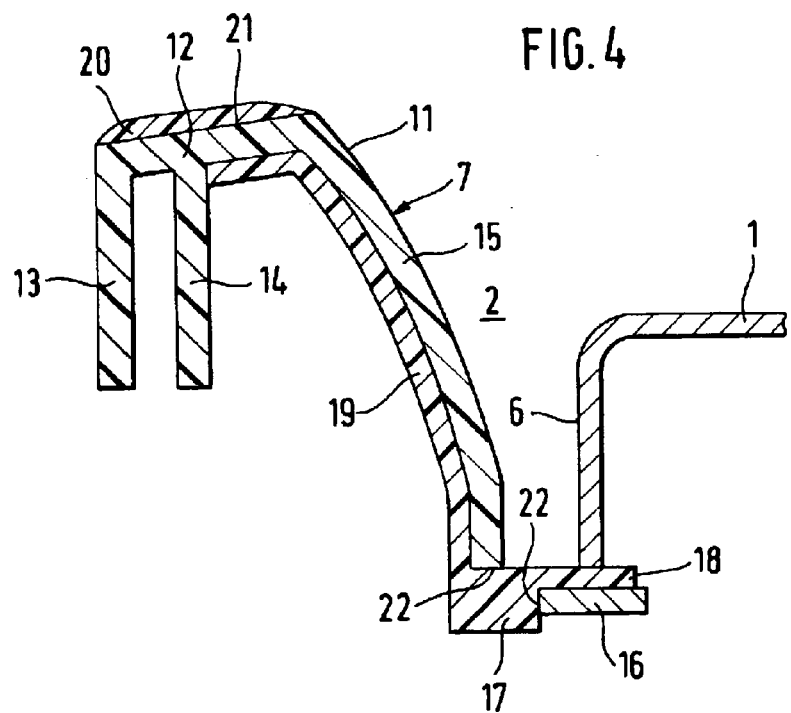
FIG. 4 shows the broken-away section along the line of intersection IV—IV in FIG. 2, although without roof frame, with the draft deflector of the first embodiment according to FIG. 3 represented in its extended operating position.

FIGS. 1 and 2 of the schematic drawings show a fixed vehicle roof 1, a roof opening 2, a cover 4 associated with the roof opening 2 and moveable along guide rails 3, and a draft deflector which is generally designated by the reference number 5. The deflector body 7, which is yet to be described in detail, of the draft deflector 5 is disposed along the front edge 6 of the roof opening 2. Extension arms 8, which may be an integral component of the draft deflector, are firmly attached to both ends of the draft deflector body 7. The two extension arms 8 (only one of which can be seen in FIG. 2) extend parallel to one another and are disposed on both sides of the roof opening 2. The extension arms 8 are disposed at bearing points 9 such that they can be swung about an axis extending parallel to the front edge 6 of the roof opening 2. The guide rails 3 and the bearing points 9 are located at a roof frame 10, which underpins the roof opening 2.

Figure 3:
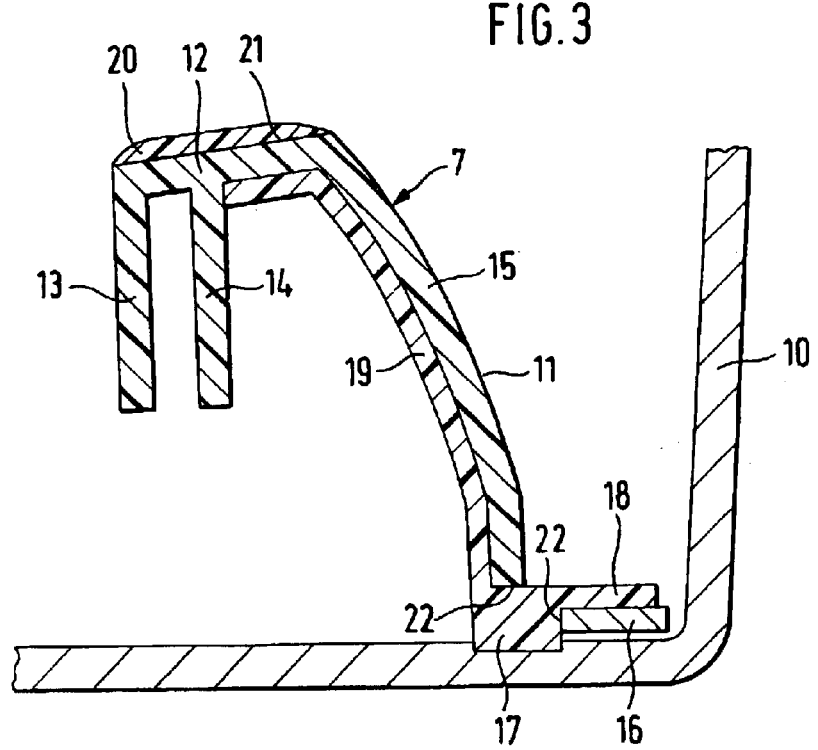
FIG. 3 shows the broken-away section along the line of intersection III—III in FIG. 1, although without roof and cover, with the draft deflector represented in its rest position, in a first embodiment.

FIGS. 3 and 4 illustrate a first example embodiment of the draft deflector 5. The rigid base body 11, which in one example is shaped from a fibre-reinforced plastics material, includes four wall portions: a top wall 12; two reinforcing walls 13 and 14, which point downwards (according to the drawings) from the top wall 12 and are spaced apart; and a curved front wall 15, which is at a spacing from the walls 13 and 14. An outward turned stop 16 adjoins the front wall 15 at the two corners of the base body 11. The stops 16 limit the extension travel of the draft deflector upwards and in the process strike from below against a bevel of the vehicle roof 1 which defines the roof opening 2 and forms the front edge 6, as represented in FIG. 4.

In this first embodiment flexible plastics elements are integrally injection molded onto the base body 11 in the regions of the two corners of the draft deflector. Flexible plastics elements 17 protrude downwards beyond the base body 11 as buffers. Flexible plastics elements 18 are located on the stops 16. Flexible plastics elements 19 are located at the inner face of the front wall 15 and also extend over a sub-region of the inner face of the top wall 12. The elements 19 secure the position of the elements 17 and 18. The element 17 is represented overlapping the roof frame in FIG. 3 (i.e., without elastic deformation). As illustrated by FIGS. 3 and 4, the injection molded elements 17 and 18 are integrally formed together. This is rendered possible by a recess 22, which is located partly in the front wall 15 and partly in the stop 16.

A flexible plastics element 20, which passes continuously over the length of the base body 11 or with embrasure-like apertures (not represented), also is injection molded onto the top face 21 of the top wall 12 of the base body 11. The element 20 provides a flexible separating edge for the airflow when the draft deflector is in the operating position. The element 20 also prevents the elements of the roof structure (not shown) located above the deflector from impacting with a rattling noise when the draft deflector is in the rest position.

The example of FIGS. 5 and 6 only differs from that of FIGS. 3 and 4 in that no flexible plastics element 20 is provided on the top wall 12.

Figure 8:
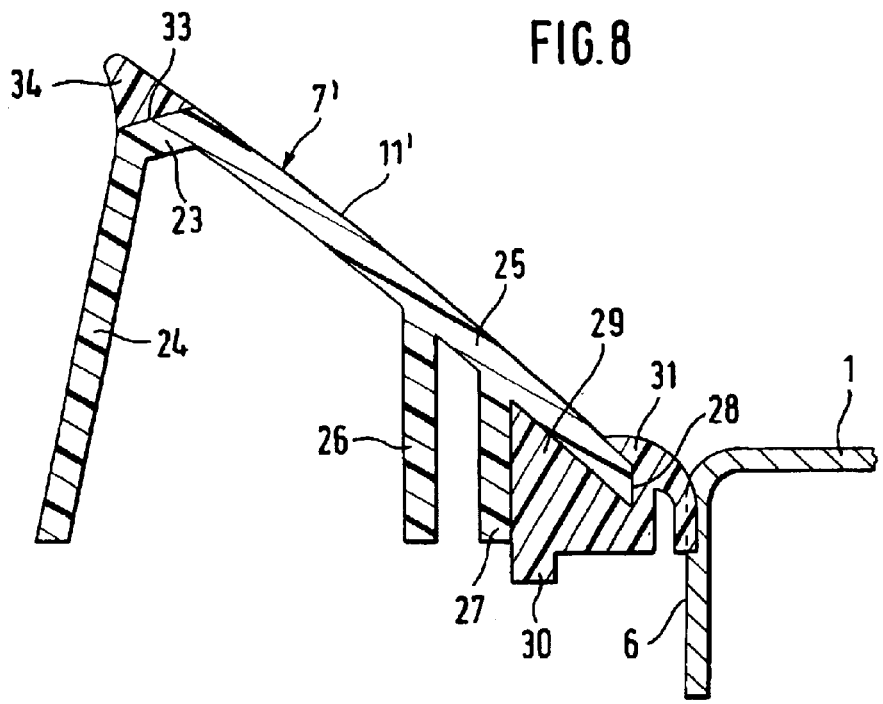
FIG. 8 shows the broken-away section along the line of intersection I VIII—VIII in FIG. 2, although without roof frame, with the draft deflector of the embodiment according to FIG. 7 represented in its extended operating position.
Figure 7:
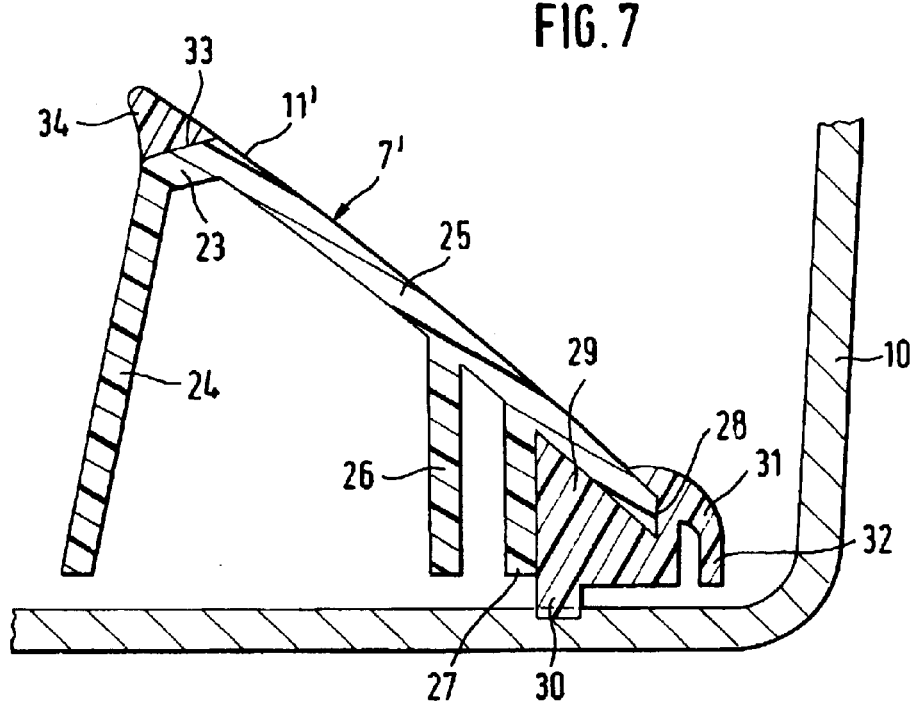
FIG. 7 shows the broken-away section along the line of intersection VII—VII in FIG. 1, although without roof frame, with the draft deflector represented in its rest position in another embodiment.

FIGS. 7 and 8 illustrate another embodiment where the base body 11' extends between the stops 16 which are located on both sides and which may be disposed and formed as described with reference to FIGS. 2 to 4. In this case the base body 11' has five wall portions: a top wall 23; a rear wall 24, which adjoins the top wall 23 on one side; an oblique front wall 25, which adjoins the top wall on the other side; and two reinforcing walls 26 and 27, which point downwards from the wall 25 and are spaced apart.

In this embodiment a flexible plastics body 29 is injection molded onto the base body 11' such that it fills the generally V-shaped space between the reinforcing wall 27 and the front wall 25. The flexible plastics body 29 in one example extends continuously approximately over the length of the base body 11'. In another example, only portions of the body 11' have an associated plastic element 29. Flexible plastics elements 30, which are integrally injection molded-on with the flexible plastics body 29 in the illustrated example, protrude downwards beyond the base body 11' and may be in the form of knubs or continuous strips.

In the illustrated example, the flexible plastics body 29 and a strip-shaped flexible plastics element 30 are continuously injection molded onto the base body 11' approximately over the length of the latter. The flexible plastics element 30 is shown overlapping the roof frame 10 (i.e., without elastic deformation) at which it is supported without rattling when the draft deflector is in the rest position.

A flexible plastics element 31, which is integrally injection molded-on with the flexible plastics body 29 and the flexible plastics element 30 in the illustrated example, also protrudes essentially continuously over the length of the base body 11' beyond the front edge 28 of the latter. The flexible plastics element 31 is formed as a hollow section 32 which is open at the bottom and can therefore be elastically deformed to a significant degree. When the draft deflector is in the operating position, which is represented in FIG. 8, this element 31 is elastically deformed to close the gap between the front edge 28 of the base body 11' and the front edge 6 of the roof cut-out. No air can flow under the draft deflector because the gap is sealed. The element 31 is in this case supported with its hollow section 32 over a considerable length at the roof 1, so that the extended draft deflector is at the same time fixed in position. In FIG. 8 the outer lip-like portion of the hollow section 32 is shown overlapping with the roof bevel (i.e., without elastic deformation).

A further flexible plastics element 34, which when viewed in cross section tapers outwards to a point, is injection molded onto the top face 33 of the top wall 23 approximately continuously over the length of the base body 11'. This flexible plastics element 34 illustrates another one of the many possible geometric shapes for obtaining a flexible separating edge for the airflow.

The injection mold used to injection mold the various described plastics elements preferably allows the base body 11 or 11' to be placed in a positioned manner in the mold, while the remaining mold cavities form the holding spaces for the flexible plastics material, which is injection molded onto the base body and then takes on the shapes which are predetermined by the cavities.

The invention provides a draft deflector for a sliding or sliding-lifting roof cover such as a sunroof or moonroof structure employing a draft deflector comprising a base body, which guarantees dimensional stability and strength, and flexible plastics elements which are injection molded on the base at all locations which are relevant in terms of noise reduction may be used to make the base body or the flexible elements. The base body, for example, may comprise suitable thermoplastic plastics materials such as polyamide 6.6, polyethylene terephthalate and polypropylene.

The flexible plastic elements may consist of an elastomeric, selected from the styrenediene block copolymer, ethylene-propylene-diene-polymethylene (EPDM), EPDM-polypropylene blends and polyurethane elastomer group.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A draft deflector for use with a vehicle roof having an opening and a cover that selectively closes the opening, the draft deflector comprising:
   a rigid bases body; and
   at least one flexible plastics element injection molded onto a selected portion of the base body including stop members near opposite sides of the base body and wherein the flexible plastics element comprises at least a portion of the flexible plastics material extending over at least a portion of each of the stop members.

2. The draft deflector of claim 1, wherein the base body has an upper side, a lower side and a forward side between the upper and lower sides and wherein the flexible element extends at least partially beyond the lower side.

3. The draft deflector of claim 1, wherein the base body has an upper side, a lower side and a forward side between the upper and lower sides and wherein the flexible element extends at least partially beyond the forward side.

4. The draft deflector of claim 3, wherein the flexible element extends at least partially beyond the lower side.

5. The draft deflector of claim 4, wherein the flexible element is integrally formed us a single element having portions extending beyond the forward side and the lower side of the base body.

6. The draft deflector of claim 3, wherein the portion of the flexible element that extends beyond the forward side includes a hollow section.

7. The draft deflector of claim 1, wherein the base body has an upper side, a lower side and a forward side and wherein the flexible element extends across the upper side.

8. The draft deflector of claim 1, wherein the base body has an upper side, a lower side and a forward side and wherein the flexible elements have portions that extend at least partially beyond the lower side and which are integrally formed with the portions extending over the stop members.

9. The draft deflector of claim 1, wherein the base body comprises a thermoplastic material reinforced with fibers of at least one of glass or carbon.

10. The draft deflector of claim 1, wherein the base body comprises one of polyamide 6.6, polyethylene terephthalate or polypropylene.

11. The draft deflector of claim 1, wherein the flexible plastics element comprises an elastomeric thermoplastic material selected from the group consisting of styrene-diene block copolymer, ethylene-propylene-diene-polymethylene (EPDM), EPDM-polypropylene blends and polyurethane elastomers.

12. A vehicle roof assembly comprising:
    a roof surface having an opening;
    at least one structural member associated with the roof surface;
    a cover that is supported by the structural member such that the cover is selectively moveable relative to the opening between at least one oven position and a closed position to close the opening; and
    a draft deflector supported for movement relative to the structural member and the roof surface opening responsive to the cover moving between the open and closed positions, the draft deflector including a rigid base body and at least one flexible plastics element permanently secured to a selected portion of the base body wherein the draft deflector includes at least one stop member that cooperates with the structural member to limit movement of the draft deflector relative to the opening and wherein the flexible plastics element is secured to the stop member such that the flexible plastics element contacts the structural member.

13. The assembly or claim 12, wherein the flexible plastics element is injection molded onto the base body.

14. The assembly of claim 12, wherein the body has an upper side, a lower side and a forward side and wherein the flexible element has portions that extend at least partially beyond the lower side and which are integrally formed with the portions extending over the stop member.

15. The assembly of claim 12, wherein the base body has an upper side, a lower side and a forward side between the upper and lower sides and wherein the flexible element extends at least partially beyond the lower side such that the flexible element contacts the structural member when the cover closes the opening.

16. The assembly of claim 12, wherein the base body has an upper side, a lower side and a forward side between the upper and lower sides and wherein the flexible element extends at least partially beyond the forward side such that the flexible element closes a gap between the forward side of the base body and a corresponding edge of the roof opening.

* * * * *

UNITED STATES PATENT AND TRADEMARK OFFICE
CERTIFICATE OF CORRECTION

PATENT NO. : 6,793,278 B2
DATED : September 21, 2004
INVENTOR(S) : Weiss et al.

It is certified that error appears in the above-identified patent and that said Letters Patent is hereby corrected as shown below:

Column 5,
Line 58, "us" should read as -- as --.

Column 6,
Line 28, "oven" should read as -- open --.

Signed and Sealed this

Twenty-first Day of December, 2004

JON W. DUDAS
*Director of the United States Patent and Trademark Office*